(12) United States Patent
Shimoyama et al.

(10) Patent No.: US 11,680,638 B2
(45) Date of Patent: Jun. 20, 2023

(54) SHIFT CONTROL METHOD AND SHIFT CONTROL SYSTEM

(71) Applicant: NISSAN MOTOR CO., LTD., Yokohama (JP)

(72) Inventors: Hiroki Shimoyama, Kanagawa (JP); Munetoshi Ueno, Kanagawa (JP); Takefumi Suzuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 44 days.

(21) Appl. No.: 17/612,332

(22) PCT Filed: May 20, 2019

(86) PCT No.: PCT/JP2019/019932
§ 371 (c)(1),
(2) Date: Nov. 18, 2021

(87) PCT Pub. No.: WO2020/234974
PCT Pub. Date: Nov. 26, 2020

(65) Prior Publication Data
US 2022/0260154 A1    Aug. 18, 2022

(51) Int. Cl.
*F16H 59/40* (2006.01)
*F16H 59/50* (2006.01)
(Continued)

(52) U.S. Cl.
CPC ............ *F16H 59/50* (2013.01); *F16H 59/40* (2013.01); *F16H 2059/186* (2013.01); *F16H 2061/0422* (2013.01)

(58) Field of Classification Search
CPC .. F16H 59/40; F16H 2061/0422; F16H 59/14; F16H 59/18; F16H 2059/186;
(Continued)

(56) References Cited

U.S. PATENT DOCUMENTS

2008/0090697 A1* 4/2008 Ortmann ............... B60W 10/10
477/15
2012/0094800 A1    4/2012 Suzuki et al.
(Continued)

FOREIGN PATENT DOCUMENTS

JP          11-91396 A      4/1999
JP          2007-112350 A   5/2007
(Continued)

*Primary Examiner* — Roger L Pang
(74) *Attorney, Agent, or Firm* — Foley & Lardner LLP

(57) ABSTRACT

The present invention provides a shift control method implemented in a vehicle equipped with an automatic transmission for controlling an input shaft rotation speed to a target input shaft rotation speed during a shift. The method includes setting of a basic target synchronization rotation speed that is a basic target value of the input shaft rotation speed during the shift, and setting of a corrected target input shaft rotation speed as the target input shaft rotation speed when the shift is a downshift without a requirement for a driving force of the vehicle, The corrected target input shaft rotation speed is obtained by decreasingly correcting the basic target synchronization rotation speed. Further, a decreasing correction amount of the basic target synchronization rotation speed is set so as to become larger as a deceleration of the vehicle becomes larger.

6 Claims, 5 Drawing Sheets

(51) Int. Cl.
  *F16H 61/04* (2006.01)
  *F16H 59/18* (2006.01)
(58) Field of Classification Search
  CPC .......... F16H 61/0403; F16H 2059/405; B60W
       2540/10; B60W 2710/0644; B60W
       2710/081; B60W 2710/1011; B60W
       10/08; B60W 30/18072; B60W 30/19
  USPC ................................................ 477/3; 701/51
  See application file for complete search history.

(56) References Cited

U.S. PATENT DOCUMENTS

| | | |
|---|---|---|
| 2019/0039602 A1 | 2/2019 | Kusabe et al. |
| 2019/0257417 A1* | 8/2019 | Christ ................. F16H 61/0213 |
| 2022/0243805 A1* | 8/2022 | Shimoyama ............ F16H 61/04 |

FOREIGN PATENT DOCUMENTS

| | | |
|---|---|---|
| JP | 2008-75718 A | 4/2008 |
| JP | 2011-133069 A | 7/2011 |
| WO | WO 2010/146677 A1 | 12/2010 |
| WO | WO 2017/057757 A1 | 4/2017 |

\* cited by examiner

SHIFT CONTROL METHOD AND SHIFT CONTROL SYSTEM

TECHNICAL FIELD

The present invention relates to a shift control method and a shift control system.

BACKGROUND ART

In a conventional shift control system as disclosed in JP2007-112350A, a judgment is made whether the shift arises from a coast downshift or not. If the shift is judged to be a coast-downshift, the basic target synchronizing rotation speed, which is a basic target value to be applied during the shift, is decreasingly corrected and set as a target input shaft rotation speed.

SUMMARY OF INVENTION

However, depending on the traveling conditions during the shift, even with the decreasing correction of the target input shaft rotation speed, the input shaft rotation speed may surpass the final target output shaft rotation speed, resulting possibly in a shift shock at the time of clutch engagement.

Considering such situations, an objective of this invention is to provide a shift control method and a shift control system that can suppress an occurrence of a shift shock when the driver performs a coast-down shift.

In an aspect of this invention, a shift control method implemented in a vehicle equipped with an automatic transmission for controlling an input shaft rotation speed of the automatic transmission to a target input shaft rotation speed during a shift is provided. The shift control method includes: setting a basic target synchronization rotation speed that is a basic target value of the input shaft rotation speed during the shift; and when the shift is a downshift without a requirement for a driving force of the vehicle, setting a corrected target input shaft rotation speed as the target input shaft rotation speed, the corrected target input shaft rotation speed being obtained by decreasingly correcting the basic target synchronization rotation speed. A decreasing correction amount of the basic target synchronization rotation speed is set so as to become larger as a deceleration of the vehicle becomes larger.

DESCRIPTION OF EMBODIMENTS

Hereinafter, embodiments of this invention are described referring to figures.

Figure 1:
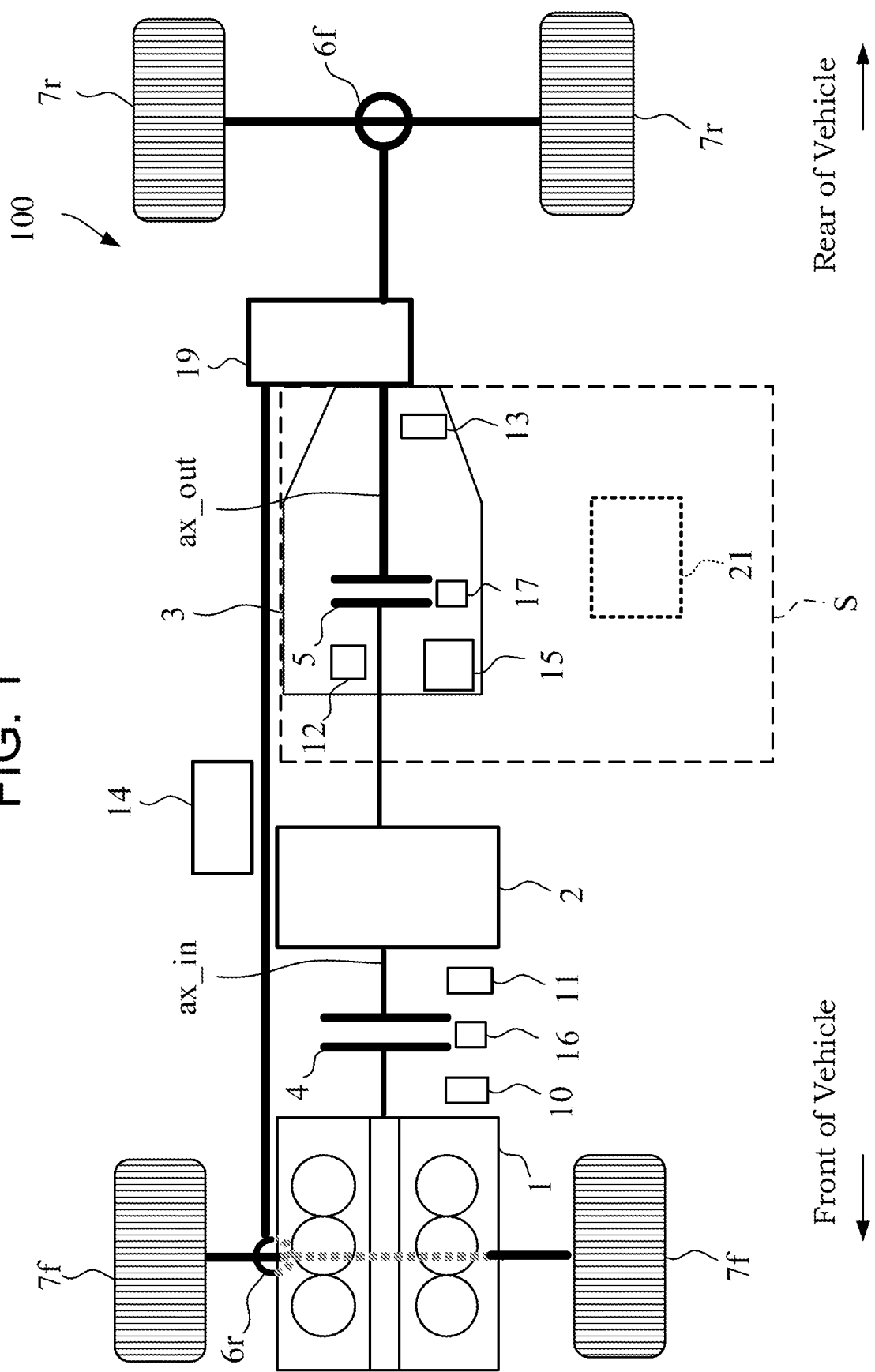
FIG. 1 shows a vehicular configuration to which a shift control method of the invention is applied.

FIG. 1 shows a power train configuration of a vehicle 100, to which a shift control method of this embodiment is applied.

As shown in the figure, the vehicle 100 of this embodiment contains an internal combustion engine 1, a motor generator 2, an automatic transmission 3, and a transfer unit 19. In this embodiment, a shift control system S is configured by the automatic transmission 3 and an integrated controller 21 (to be further described later) acting as a shift controller.

Inside the vehicle 100 of this embodiment, the internal combustion engine 1, the motor generator 2 and the automatic transmission 3 are arranged in order from a front side toward running direction (or vehicle front) to a rear side. The internal combustion engine 1, the motor generator 2 and the automatic transmission 3 are mutually connected by way of an input shaft ax_in. In other words, the vehicle 100 of this embodiment is constructed as a hybrid vehicle having two sources of driving force, i.e. the internal combustion engine 1 and the motor generator 2.

The input shaft ax_in is provided with a clutch (a first clutch 4) in a position between the internal combustion engine 1 and the motor generator 2. Therefore, transmission of force between the internal combustion engine 1 and the motor generator 2 can be on-off controlled by engaging or releasing the first clutch 4.

The first clutch 4 is configured by a wet multiple disc clutch allowing a torque transmission capacity Tc1 to vary through changing the volume and pressure of working fluid for the clutch continuous or step-wise by means of a first solenoid valve 16.

The automatic transmission 3 is a device to automatically change speed between the input shaft ax_in and an output shaft ax_out. Specifically, the automatic transmission 3 has the following elements: the second clutch 5, an input rotation sensor 12, an output rotation sensor 13, and the mechanical oil pump 15.

The second clutch 5 can be configured by a wet multiple disc clutch allowing a torque transmission capacity Tc2 to vary through changing the volume and pressure of working fluid for the clutch continuous or stepwise by means of a second solenoid valve 17.

Magnitude of a solenoid current provided to the second solenoid valve 17 is controlled by the command from the integrated controller 21 (i.e. the shift control unit) such that the torque transmission capacity Tc2 coincides with a desired target torque transmission capacity tTc2.

The input rotation sensor 12 detects the rotation speed of the input shaft ax_in (hereinafter simply referred to as "input shaft rotation speed N_in"). The input rotation sensor 12 transmits the detected input shaft rotation speed N_in (hereinafter also referred to as the "actual input shaft rotation speed Nd_in") to the integrated controller 21.

The output rotation sensor 13 detects the rotation speed of the input rotation sensor 12 (hereinafter also referred to as "output shaft rotation speed Nd_out"). The output rotation sensor 13 transmits the detected output shaft rotation speed N_out (hereinafter also referred to as "actual output shaft rotation speed Nd_out") to the integrated controller 21.

The mechanical oil pump 15 is driven by the internal combustion engine 1, and provides clutch working fluid to the second clutch 5. The electric sub-oil pump 14, driven by the motor generator 2, may be used as an auxiliary pump to complement the supply of the working fluid to the second clutch 5.

The transfer unit 19 is arranged on the output side of the automatic transmission 3. The transfer unit 19 is a driving force distribution mechanism that divides and transmits a rotation of the output shaft ax_out to a front wheel 7f and a rear wheel 7r via a front final drive 6f and a rear final drive 6r respectively.

The vehicle 100 with the configuration described above provides the following two main interchangeable driving modes: an electric power traveling mode ("EV mode") and a hybrid traveling mode ("HE mode").

If the EV mode is selected, the first clutch 4 is released and the second clutch 5 is engaged. With this setting, the output only from the motor generator 2 is transmitted to the output shaft ax_out via the input shaft ax_in and the automatic transmission 3.

If the HEV mode is selected, both the first clutch 4 and the second clutch 5 are engaged. With this setting, the output from both the internal combustion engine 1 and the motor generator 2 is transmitted to the output shaft ax_out via the input shaft ax_in and the automatic transmission 3.

In the HEV mode, if the energy produced by the internal combustion engine 1 becomes redundant, a redundant energy is converted to an electric power by driving the motor generator 2 as a power generator and stored into a battery 9 as described below. The electric power stored in the battery can be used to drive the motor generator 2 when running under a high load, and thus fuel efficiency of the internal combustion engine 1 is improved.

The following paragraphs describe a control system mounted on the vehicle 100.

Figure 2:
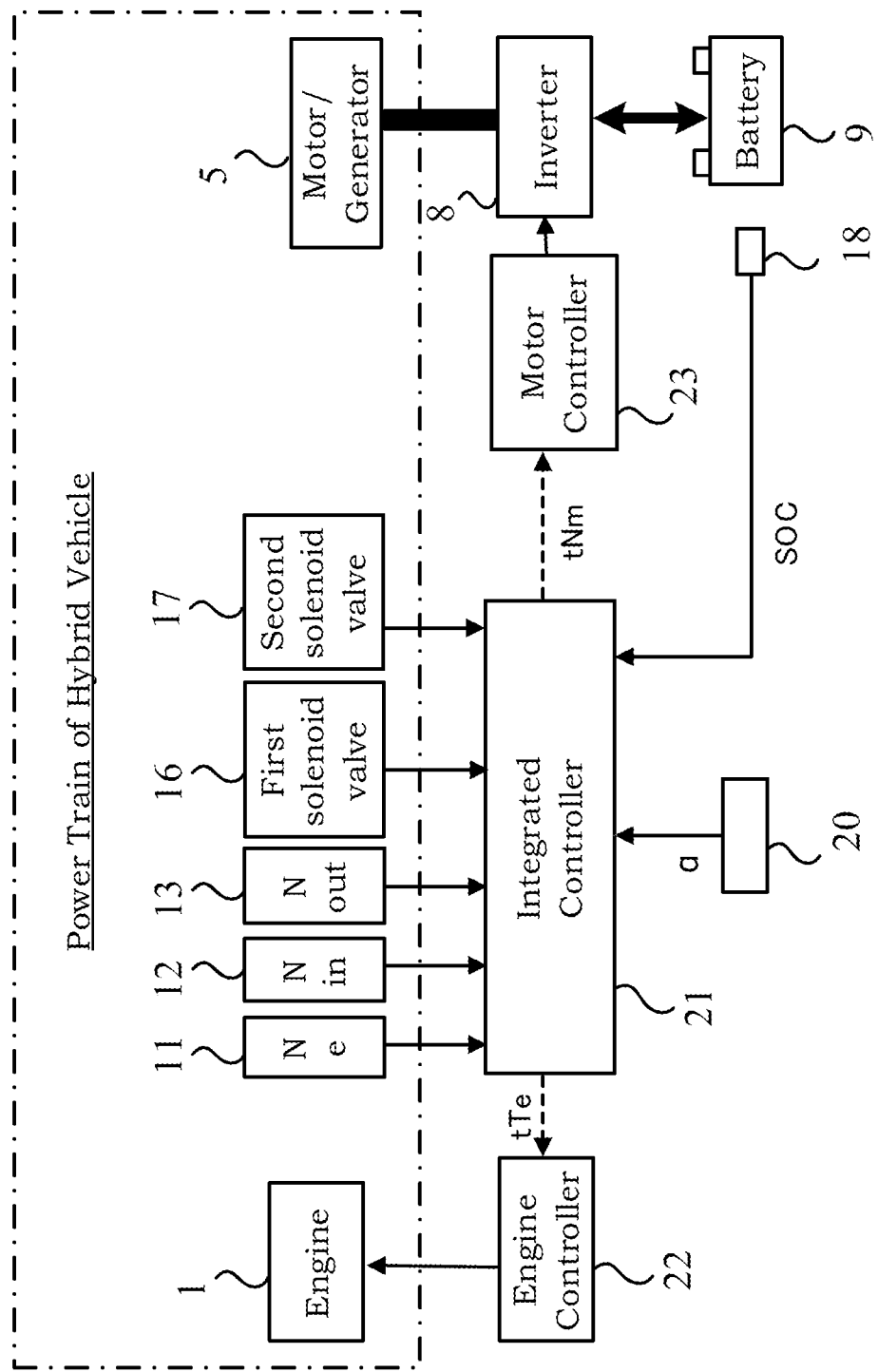
FIG. 2 is a block diagram illustrating a vehicular control system.

FIG. 2 is a block diagram illustrating the control system mounted on the vehicle 100. As shown in the figure, the control system mounted on the vehicle 100 has the integrated controller 21, the engine controller 22, the motor controller 23, and the inverter 8.

The integrated controller 21 is a device to integrally control an operating point of a power train. The integrated controller 21 controls the operating point of the power train based on the following parameters: an engine rotation speed Ne detected by the engine rotation sensor 12; the actual input shaft rotation speed Nd_in detected by the input rotation sensor 12; the actual output shaft rotation speed Nd_out detected by the output rotation sensor 13; an accelerator opening α (demand load) detected by an accelerator opening sensor 20, and charging state (SOC) of the battery 9 detected by the SOC sensor 18. The integrated controller 21 also obtains as additional input information that includes a detected value from a vehicle speed sensor (not shown in the figure) or a vehicle speed V calculated by a predefined calculation.

The integrated controller 21 performs a rotation synchronizing shift as the method of shift control in this embodiment. More particularly the integrated controller 21 uses the motor generator 2 to control the input shaft rotation speed N_in to approach a final target value to be realized after the shift has completed. Hereinafter the final target value is also referred to as "final target synchronization rotation speed tN_in*").

In particular, the integrated controller 21 of the present embodiment sets the target motor rotation speed tNm, so that the actual input shaft rotation speed Nd_in becomes close to a target synchronization rotation speed tN_in during the shift. Specifically, the integrated controller 21 calculates the target motor rotation speed tNm by removing a rotation speed component due to the rotation of the internal combustion engine 1 from the input shaft rotation speed Nd_in. The rotation speed due to the internal combustion engine 1 is defined as a net rotation speed actually transmitted to the motor generator 2. The net rotation speed is obtained by correcting the engine rotation speed Ne by a reduction ratio of the power transmission path from the internal combustion engine 1 to the motor generator 2.

The engine controller 22 is a device to control the internal combustion engine 1 to operate at a desired operating point (a target engine torque tTe) commanded by the integrated controller 21. More specifically, the engine controller 22 controls an air flow actuator and a fuel flow actuator (both not shown in the figure), each of which is provided so as to be served as an auxiliary device.

The motor controller 23 controls the inverter 8 to adjust the power supply from the battery 9 to the motor generator 2 to satisfy the operating point of the power train (a target motor torque tTm or the target motor rotation speed tNm, etc.) commanded by the integrated controller 21. In particular, the motor controller 23 of the present embodiment controls the inverter 8 to have the motor rotation speed Nm matched with the target motor rotation speed tNm, which has been calculated by the integrated controller 21.

Each of the controllers as described above—the integrated controller 21, engine controller 22, and motor controller 23—can be embodied with a computer (especially, a microcomputer), which consists of a central processing unit (CPU), a read only memory (ROM), a random access memory (RAM), and an input/output (I/O) interface.

In the following paragraphs, detailed descriptions are given to the shift method implemented by the integrated controller 21 in the present embodiment.

Figure 3:
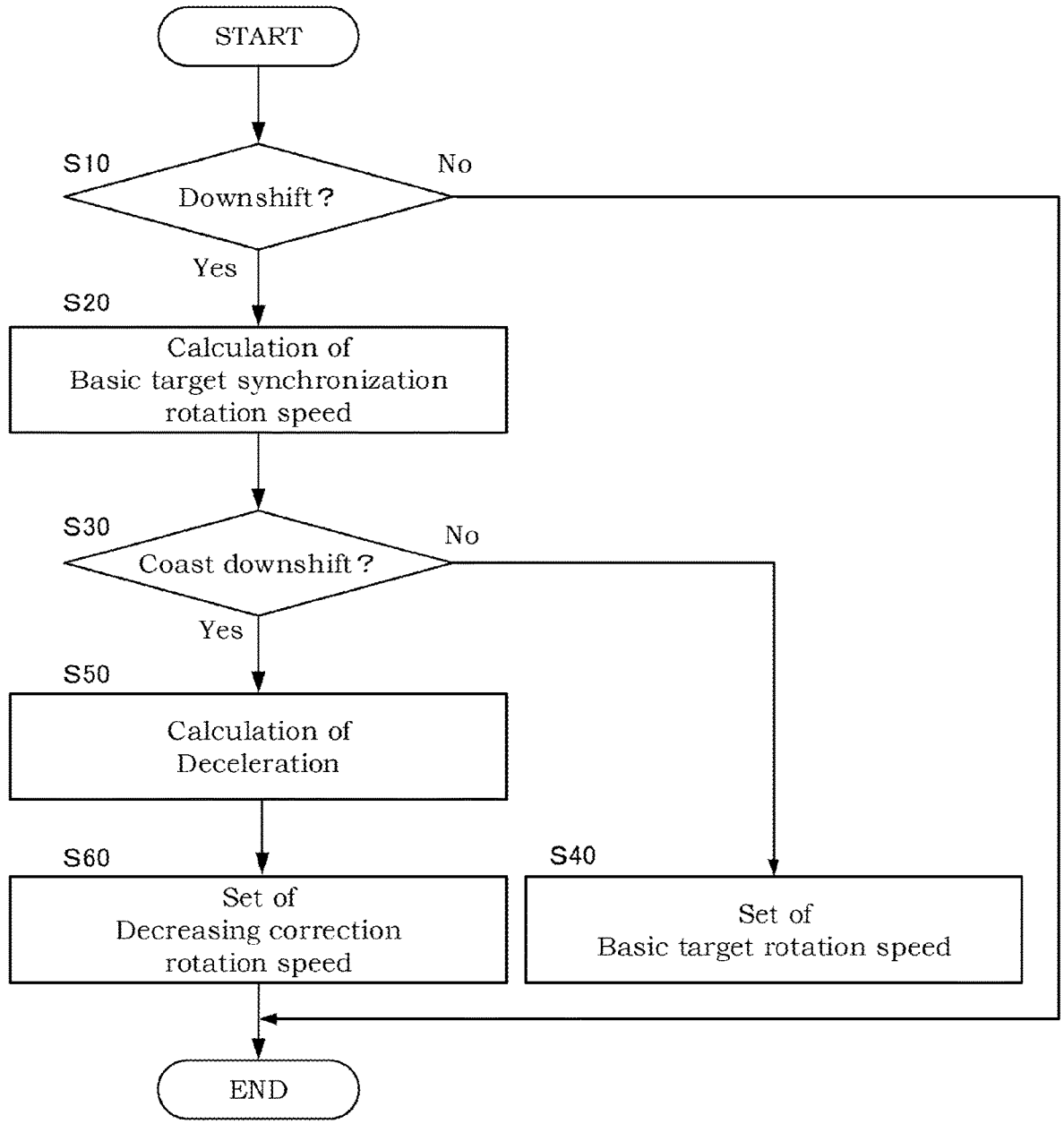
FIG. 3 is a flow chart for illustrating the shift control method implemented in the present embodiment.

FIG. 3 is a flow chart illustrating t for illustrating the shift control method implemented in the present embodiment. The integrated controller 21 in the present embodiment performs the processing shown in FIG. 3 repeatedly at each of given control periods.

Figure 4:
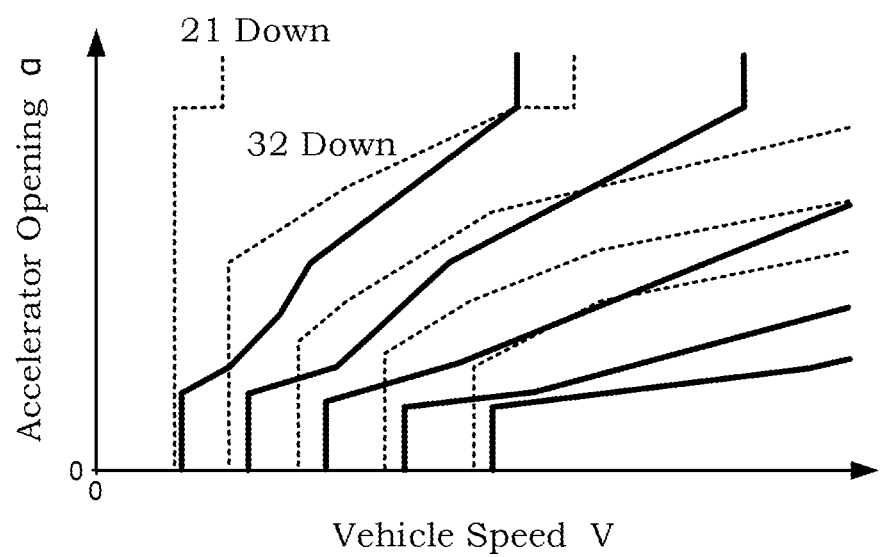
FIG. 4 shows an example of a shift map.

In step S10, the integrated controller 21 determines whether a timing has come for the vehicle 100 to execute a downshift based on the accelerator opening α and vehicle speed V, referring to a predetermined shift map (FIG. 4).

Specifically, the integrated controller 21 decides to perform the downshift if at least one of the two parameters—the accelerator opening α or the vehicle speed V—has changed to a sufficient degree during the given control period to move the operating point of the vehicle 100 to cross the downshift line (dotted line in FIG. 4).

If the decision in step S10 is negative, the integrated controller 21 exits from this routine. On the other hand, if the decision is affirmative, the integrated controller 21 proceeds to and after step S20

In step 20, the integrated controller 21 calculates a basic target synchronizing rotation speed tbN_in.

More specifically, the integrated controller 21 has the actual output shaft rotation speed Nd_out signal filtered to remove noise and high frequency vibration components. Then, the integrated controller 21 multiplies the filtered signal with the target change gear ratio γ to obtain the basic target synchronizing rotation speed tbN_in.

A target change gear ratio γ used for the shift control in the embodiment is defined as the ratio of the actual output shaft rotation speed Nd_out to the actual input shaft rotation speed Nd_in.

The basic target synchronizing rotation speed tbN_in is calculated using the equation (1) below.

[Formula 1]

$$tbN\_in = (\text{the filtered } Nd\_out) \times \gamma \qquad (1)$$

In step 30, the integrated controller judges whether the vehicle 100 is coast traveling or not. The coast traveling here means a running state that the accelerator opening α is almost zero (namely, driving force required to the vehicle 100 is almost zero).

In other words, the integrated controller 21 determines whether the shift is substantially a coast downshift by determining whether the accelerator opening α is almost zero in step 30 on the premise of the positive result in step 10.

The integrated controller 21 proceeds to step S40 when determining the shift is not the coast downshift, and then set the basic target synchronization rotation speed tbN_in to the target input shaft rotation speed tN_in.

The integrated controller 21 proceeds to step S50 when determining the shift is the coast downshift.

In step S50, the integrated controller 21 calculates a deceleration $a_d$ of the vehicle 100. The deceleration $a_d$ is calculated as an absolute value of a time differential of the vehicle speed V.

Then, in step S60, the integrated controller 21 performs a rotation speed decreasing correction. More particularly, the integrated controller 21 calculates a corrected target input shaft rotation speed tN_inC by subtracting a decreasing correction amount ΔN_ from the basic target synchronizing rotation speed tbN_in obtained in step S20.

Here, the integrated controller 21 determines the decreasing correction amount ΔN_ based on the deceleration $a_d$ calculated in step S50. In this embodiment, the integrated controller 21 sets the decreasing correction amount ΔN_ so that it becomes larger as the deceleration $a_d$ becomes larger. The decreasing correction amount ΔN_ is set to change as a strict monotonously increasing function ΔN_($a_d$) of the deceleration.

More specifically, the integrated controller 21 of the embodiment varies the decreasing correction amount ΔN_ in accordance with the progress of the shift process. More specifically, the integrated controller 21 sets a first decreasing correction amount ΔN1_ in a first half of the shift process while sets a second decreasing correction amount ΔN2_ in a latter half of the shift process. The first decreasing correction amount ΔN1_ is a relatively large amount while the second decreasing correction amount ΔN2_ is a relatively small amount.

For each of the first and second decreasing correction amount ΔN1_ and ΔN2_, a strict monotonously increase function (ΔN1 ($a_d$), ΔN2 ($a_d$)) of the deceleration $a_d$ is defined independently. Therefore, a relative magnitude relation between the first decreasing correction amount ΔN1_ and the second decreasing correction amount ΔN2_ can be defined on the premise that the deceleration $a_d$ becomes a constant value.

The corrected target input shaft rotation speed tN_inC in the first half of the shift (hereinafter also referred to as "first corrected target input shaft rotation speed tN_inC1") and it in the latter half (hereinafter also referred to as "second corrected target input shaft rotation speed tN_inC2") are calculated using the following equation (2) and (3) respectively.

[Formula 2]

$$tN\_inC1 = tbN\_in - \Delta N1\_ \quad (2)$$

[Formula 3]

$$tN\_inC2 = tbN\_in - \Delta N2\_ \quad (3)$$

Then, the integrated controller 21 sets the corrected target input shaft rotation speed tN_inC as the target input shaft rotation speed tN_in, and outputs it to the motor controller 23.

According to the shift control method shown in FIG. 3, the corrected target input shaft rotation speed tN_inC is set to the target input shaft rotation speed tN_in, the corrected target input shaft rotation speed tN_inC being obtained by correcting the basic target synchronizing rotation speed tbN_in in a negative direction according to the deceleration $a_d$ of the vehicle 100.

Next, a behavior of the input shaft rotation speed N_in during the coast downshift are explained.

Figure 5:
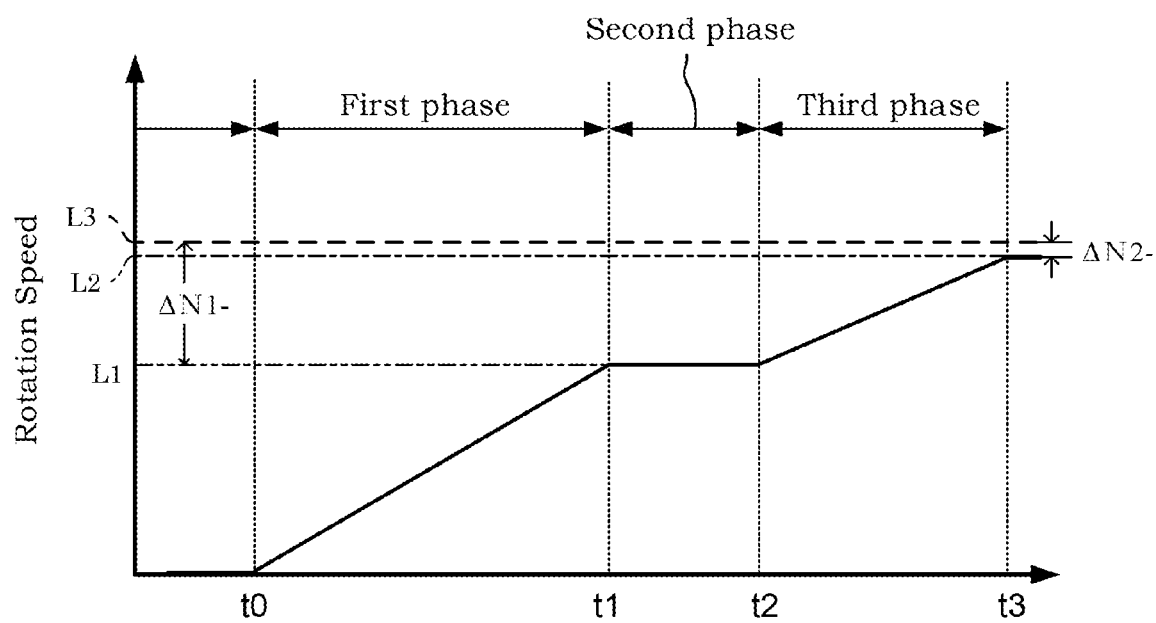
FIG. 5 is a time chart for showing temporal changes of a target input shaft rotation speed while the driver is performing a coast-downshift.

FIG. 5 is a time chart showing a temporal change of the target input shaft rotation speed tN_in during the coast downshift. Note that, to facilitate understanding the shift control method in the embodiment, the vehicle speed during the coast downshift is assumed to be constant.

A chain double-dashed line L1 indicates a final value of the first corrected target input shaft rotation speed tN_inC1. A dashed line L2 indicated a final value of the second corrected target input shaft rotation speed tN_inC2. Further, a broken line L3 indicates the final target synchronizing rotation speed tN_in*.

As seen from FIG. 5, a shift phase in the present embodiment are divided into three (first, second and third phase) after the elapse of a preliminary phase before the shift starts. Particularly in the embodiment, the first half of the shift includes the first and second phases, and the latter half of the shift includes the third phase.

During the preliminary phase—from the start of the shift control ("Yes" in step S10 of FIG. 3) to the time point t0—preliminary control operations (such as releasing of the second clutch 5) are performed.

At the time point t0, the phase of shift is transferred from the preliminary phase to the first phase and the control of the input shaft rotation speed N_in starts. At the timing of transition to the first phase, the target input shaft rotation speed tN_in is set according to the processes of step S50 and step S60.

Namely, the first corrected target input shaft rotation speed tN_inC1 (i.e. The basic target synchronizing rotation speed tbN_in corrected for offset decreasingly by the first decreasing correction amount ΔN1_) is set to the target input shaft rotation speed tN_in, which should take effect during the first and second phases.

Therefore, the input shaft rotation speed N_in increases approaching the first corrected target input shaft rotation speed tN_inC1.

At the time point t1, the phase of shift is transferred from the first phase to the second phase. In the second phase, the target input shaft rotation speed tN_in maintains the value specified by the first corrected target input shaft rotation speed tN_inC1, which was defined at the start of the first phase, for a given period of time to promote the input shaft rotation speed N_in to converge stably to the first corrected target input shaft rotation speed tN_inC1.

Then, at the time point t2, the phase of shift is transferred from the second phase to the third phase.

In the third phase, the second corrected target input shaft rotation speed tN_inC2 is set to the target input shaft rotation speed tN_in. With this setting, the input shaft rotation speed N_in starts to change from the first corrected target input shaft rotation speed tN_inC1, which is set during the first and second phase, toward the second corrected target input shaft rotation speed tN_inC2.

At the end of the third phase (time point t3), the target input shaft rotation speed tN_in is switched to the final target synchronizing rotation speed tN_in*. When the input shaft rotation speed N_in is judged to have stably converged to the final target synchronization speed tN_in*, the shift control process completes with the engagement of the second clutch 5.

In the subsequent paragraphs, background art preceding this embodiment is explained. To simplify the descriptions, the symbols used to identify parameters in this embodiment are also used for the corresponding ones that appear in the background art.

During a coast downshift of the vehicle 100 where the required driving force is nearly zero, the decreasing rate of the actual output shaft rotation speed Nd_out becomes larger than that of a case where there is a request for the driving force. Therefore, the basic target synchronizing rotation speed tbN_out, which is obtained by filtering the actual output shaft rotation speed Nd_out (see Eq.1), follows the decrease of the actual output shaft rotation speed Nd_out with a delay.

According to background art, when a coast downshift is to be performed, a value obtained by decreasingly correcting the basic target synchronizing rotation speed tbN_1 with a certain amount is set as the target input shaft rotation speed tN_in in view of compensating the delay.

However, when the deceleration $a_d$ of the vehicle 100 becomes larger than a certain level during the shift process, the decreasing rate of the actual output shaft rotation speed Nd_out may become more rapid and result in producing more significant effect on the delay of the basic target synchronizing rotation speed tbN_in for the decreasing in the actual output shaft rotation speed Nd_out. As a result, the engagement of the second clutch 5 may occur at where the actual input shaft rotation speed Nd_in is overshooting the final target synchronizing rotation speed tN_in* and it results in a shift shock.

To provide a solution to such problems in the background art, the present embodiment provides the shift control method, wherein, as the deceleration $a_d$ of the vehicle 100 during the coast downshift becomes larger, correspondingly the decreasing correction amount ΔN_ for the basic target synchronization rotation speed tbN_in is made to be larger.

In this way, the input shaft rotation speed N_in can be more suitably adjusted during the coast downshift suppressing the overshoot of the actual input shaft rotation speed Nd_in from the final target synchronization rotation speed tN_in* at the time of the engagement of the second clutch 5. It thus enables to avoid the occurrence of the shift shock.

In the following paragraphs, actual effects the configuration of this embodiment exert are further described.

In this embodiment, a shift control method implemented in a vehicle 100 equipped with an automatic transmission 3 for controlling an input shaft rotation speed N_in of the automatic transmission 3 to a target input shaft rotation speed tN_in during a shift.

The shift control method includes setting a basic target synchronization rotation speed tbN_in that is a basic target value of the input shaft rotation speed N_in during the shift (step S20 in FIG. 3), and setting a corrected target input shaft rotation speed tN_inC as the target input shaft rotation speed tN_in (step S30, S50 and S60 of FIG. 3) when the shift is a downshift without a requirement for a driving force of the vehicle 100 ("Yes" in step S30). The corrected target input shaft rotation speed tN_inC is obtained by decreasingly correcting the basic target synchronization rotation speed tbN_in.

Further, a decreasing correction amount ΔN_ of the basic target synchronization rotation speed tbN_in is set so as to become larger as a deceleration $a_d$ of the vehicle 100 becomes larger.

Thus, during a coast downshift, the basic target synchronizing rotation speed tbN_in is decreasingly corrected corresponding to the deceleration $a_d$ of the vehicle 100. As a result, the input shaft rotation speed N_in can be more suitably adjusted during a coast downshift process depending on the deceleration $a_d$, which may cause a delay in the basic target synchronizing rotation speed tbN_in.

More particularly, in the shift control method of this embodiment, the basic target synchronizing rotation speed tbN_in is calculated by applying a filter processing to an actual output shaft rotation speed Nd_out of the automatic transmission 3 during the shift, and by multiplying with the target shift ratio γ (see the above equation (1)).

During the coast downshift under that the deceleration $a_d$ is larger than a certain level, the basic target synchronizing rotation speed tbN_in calculated in this way follows the decreasing in the actual output shaft rotation speed Nd_out with a delay due to the filtering. In such situation, according to the shift control method of the embodiment, the corrected target input shaft rotation speed tN_inC is set in such a way that it becomes increasingly smaller than the basic target synchronization rotation speed tbN_in as the deceleration $a_d$ of the vehicle 100 becomes larger.

In this way, even in a situation where the deceleration $a_d$ during the coast downshift becomes larger than a certain level, the overshoot of the actual input shaft rotation speed Nd_in from the final target synchronization rotation speed tN_in* can be avoided. As the result, shift shocks at the time of clutch engagement caused by the overshoot can be suitably suppressed.

In the shift method of this embodiment, the corrected target input shaft rotation speed tN_inC includes a first corrected target input shaft rotation speed tN_inC1 and a second corrected target input shaft rotation speed tN_inC2. The first corrected target input shaft rotation speed tN_inC1 has a relatively large decreasing correction ΔN_ (the first decreasing correction amount ΔN1_). The second corrected target input shaft rotation speed tN_inC2 has a relatively small decreasing correction ΔN_ (the second decreasing correction amount ΔN2_).

In the first half of the shift (the first and second phases), the first corrected target input shaft rotation speed tN_inC1 is set as the target input shaft rotation speed tN_in. In the second half (the third phase), the second corrected target input shaft rotation speed tN_inC2 is set as the target input shaft rotation speed tN_in.

During the first half of the shift, relatively far from the termination of the shift (time point t3 in FIG. 5), a value smaller than the basic target synchronizing rotation speed tbN_in is set as the target input shaft rotation speed tN_in. This setting prevents an accumulation of the overshooting component of the actual input shaft rotation speed Nd_in (caused by the deceleration $a_d$ of the vehicle 100) over a long period until the termination of the shift.

On the other hand, in the latter half, relatively near to the end of the shift, a value more closer to the basic target synchronizing rotation speed tbN_in is set as the target input shaft rotation speed tN_in. The accumulation period of the overshooting component in the latter half is shorter than that of the first half because the latter half of the shift is nearer to the end of the shift. By setting a value relatively close to the basic target synchronizing rotation speed tbN_in as the target input shaft rotation speed tN_in in the latter half of the shift, earlier approach of the actual input shaft rotation speed Nd_in to the basic target synchronization rotation speed tbN_in is promoted while suppressing the occurrence of overshoot. It thus results in smoother transition of the shift.

The input shaft rotation speed N_in is controlled by the motor generator 2, which serves as an electric motor mounted on the vehicle 100 as a source of the driving force.

The use of the motor generator 2 enables the rotation synchronizing shifts to be electrically controlled.

Further according to the embodiment, a shift control system S for the vehicle 100 having the automatic transmission 3 and the integrated controller 21 controlling the input shaft rotation speed tN_in of the automatic transmission 3 to the target input shaft rotation speed tN_in during the shift.

The integrated controller 21 as a shift control device includes a basic target synchronizing rotation speed setting unit (step S20 in FIG. 3) configured to set the basic target synchronization rotation speed tbN_in that is the basic target value of the input shaft rotation speed N_in during the shift, and a rotation speed decreasing correction unit (step S30, S50 and S60 in FIG. 3) configured to set the corrected target input shaft rotation speed tN_inC as the target input shaft rotation speed tN_in when the shift is a downshift without a requirement for a driving force of the vehicle 100 ("Yes" in step S30). The corrected target input shaft rotation speed tN_inC is obtained by decreasingly correcting the basic target synchronization rotation speed tbN_in.

Further, the rotation speed decreasing correction unit is configured to set the decreasing correction amount $\Delta N\_$ of the basic target synchronization rotation speed tbN_in so as to become larger as a deceleration $a_d$ of the vehicle 100 becomes larger.

The configuration described above provides a system suitable to perform the shift control.

Another Embodiment

Hereinafter, another embodiment related to this invention is described. In the embodiment described hereinafter, a wheel speed sensor detecting a wheel speed of a driven wheel is equipped in addition to the configuration members of the vehicle 100 as described. Here, the driven wheel of the vehicle 100 is a wheel to which no direct load from the internal combustion engine 1 is transmitted (the rear wheel 7r in FIG. 1), and the internal combustion engine 1 (the source of driving force) is not mounted directly above the wheel.

The integrated controller 21 calculates the vehicle speed V, which is for determining the deceleration $a_d$, based on the wheel speed detected by the wheel speed sensor. More particularly, the integrated controller 21 calculates the vehicle speed V by applying a filter to the detected wheel speed. The filter is selected depending on a vehicle model for the vehicle 100.

By using the wheel speed to calculate the vehicle speed V, erroneous detection (in many cases to higher side) of the deceleration $a_d$ under the influence factors such as the resonance of the power train system. In the control method to determine the operating point of the internal combustion engine 1 and motor generator 2 mounted on the vehicle 100, the vehicle speed V as the input information should preferably be obtained from the driving wheel (front wheel 7f). Because the load placed on the driving wheel is normally larger that placed on the driven wheel, the use of driving wheel data is preferred in view of eliminating the error caused by slipping of the wheel.

In the shift control method of this embodiment, however, the vehicle speed V used to determine the deceleration $a_d$, which in turn determine the decreasing correction amount $\Delta N$ during a coast downshift, has only small effect on the control even with some slip error. Furthermore, the driving wheel velocity data may contain errors associated with the resonant frequency caused by the movement of power train actuators such as the internal combustion engine 1. From the viewpoint of determining deceleration $a_d$ from the vehicle speed V, these errors have larger effect than the errors caused by slipping of the wheel.

From these considerations, calculation of the vehicle speed V from the driven wheel velocity provides a suitable way to obtain deceleration $a_d$ for the purpose of determining the decreasing correction amount $\Delta N\_$ to be used during a coast downshift.

While the present invention has been shown and described herein relative to what are conceived to be the most preferred embodiments, it is to be understood that these embodiments represent only a part of the useful applications of this invention, thus by no means to limit the technical aspects to the concrete configurations of these embodiments disclosed herein.

In the embodiment described herein, the motor generator 2 is used to adjust the input shaft rotation speed N_in during the shift process. However, an actuator that can be used to adjust the input shaft rotation speed N_in is not limited to the motor generator 2. For example, the input shaft rotation speed N_in can be adjusted by controlling the output of the internal combustion engine 1 while the first clutch 4 is kept engaged.

In the embodiment described herein, it is estimated that the driving force for the vehicle 100 is not required (i.e. during the coast running) based on the fact that the accelerator opening α is zero. However, the method for estimating the requirement for the driving force to the vehicle 100 is not limited to the above. For example, in case if the so-called automatic driving or auxiliary driving support function are installed on the vehicle 100, the parameters produced by these mounted devices, or the directions from the driver, can be used as equivalent variables to estimate that the requirement for the driving force to the vehicle 100 is absent.

The invention claimed is:

1. A shift control method implemented in a vehicle equipped with an automatic transmission for controlling an input shaft rotation speed of the automatic transmission to a target input shaft rotation speed during a shift, comprising:
   setting a basic target synchronization rotation speed that is a basic target value of the input shaft rotation speed during the shift; and
   when the shift is a downshift, determining whether or not the downshift is a coast downshift, the coast downshift being the downshift without a requirement for a driving force of the vehicle; and
   if it is determined that the shift is not the coast downshift, setting the basic target synchronization rotation speed as the target input shaft rotation speed,
   if it is determined that the shift is the coast downshift, setting a corrected target input shaft rotation speed as the target input shaft rotation speed, the corrected target input shaft rotation speed being obtained by decreasingly correcting the basic target synchronization rotation speed, wherein
   a decreasing correction amount of the basic target synchronization rotation speed is set so as to become larger as a deceleration of the vehicle becomes larger.

2. A shift control method according to claim 1 comprising:
calculating the basic target synchronization rotation speed by applying a filter processing to an actual output shaft rotation speed of the automatic transmission during the shift and then by multiplying a target shift ratio.

3. A shift control method according to claim 1, wherein the corrected target input shaft rotation speed comprises a first corrected target input shaft rotation speed and a second corrected target input shaft rotation speed,
- the first corrected target input shaft rotation speed having a relatively large correction amount, and the second corrected target input shaft rotation speed having a relatively small correction amount, the shift control method comprising;
- in a first half of the shift, setting the first corrected target input shaft rotation speed as the target input shaft rotation speed, and
- in a latter half of the shift, setting the second corrected target input shaft rotation speed as the target input shaft rotation speed.

4. A shift control method according to claim 1 comprising:
calculating the deceleration based on a wheel velocity of a driven wheel of the vehicle.

5. A shift control method according to claim 1 comprising:
controlling the input shaft rotation speed by an electric motor mounted on the vehicle as a source of the driving force.

6. A shift control system for a vehicle having an automatic transmission and a shift control device controlling an input shaft rotation speed of the automatic transmission to a target input shaft rotation speed during a shift, wherein
the shift control device comprises:
- a basic target synchronization rotation speed set unit configured to set a basic target synchronization rotation speed that is a basic target value of the input shaft rotation speed during the shift: and
- a rotation speed decreasing correction unit configured to:
    when the shift is a downshift, determine whether or not the downshift is a coast downshift, the coast downshift being the downshift without a requirement for a driving force of the vehicle; and
    if it is determined that the shift is not the coast downshift, set the basic target synchronization rotation speed as the target input shaft rotation speed,
    if it is determined that the shift is the coast downshift, set a corrected target input shaft rotation speed as the target input shaft rotation speed, the corrected target input shaft rotation speed being obtained by decreasingly correcting the basic target synchronization rotation speed, wherein
the rotation speed decreasing correction unit is configured to set a decreasing correction amount of the basic target synchronization rotation speed so as to become larger as a deceleration of the vehicle becomes larger.

* * * * *